United States Patent
Janakiraman et al.

(10) Patent No.: US 8,068,501 B2
(45) Date of Patent: Nov. 29, 2011

(54) SYSTEM AND METHOD FOR REAL-TIME CORRELATION OF AAL2 AND AAL5 MESSAGES FOR CALLS IN UTRAN

(75) Inventors: Vignesh Janakiraman, Plano, TX (US); Balaji Ratakonda, Richardson, TX (US); Shankar Selvavinayagam, Flower Mound, TX (US); Bhuvani Hari, Richardson, TX (US)

(73) Assignee: Tektronix, Inc., Beaverton, OR (US)

( * ) Notice: Subject to any disclaimer, the term of this patent is extended or adjusted under 35 U.S.C. 154(b) by 909 days.

(21) Appl. No.: 12/043,112

(22) Filed: Mar. 5, 2008

(65) Prior Publication Data

US 2008/0240060 A1     Oct. 2, 2008

Related U.S. Application Data

(60) Provisional application No. 60/909,295, filed on Mar. 30, 2007.

(51) Int. Cl.
*H04L 12/56* (2006.01)
(52) U.S. Cl. ............... 370/395.6; 370/238.1; 370/310.1
(58) Field of Classification Search ............... 370/238.1, 370/310.1, 352, 390, 395.1, 395.52, 395.6, 370/395.61, 395.63–395.65, 428; 709/224, 709/230, 246
See application file for complete search history.

(56) References Cited

U.S. PATENT DOCUMENTS

| | | | |
|---|---|---|---|
| 2002/0089988 A1* | 7/2002 | Lee | 370/395.6 |
| 2003/0067916 A1* | 4/2003 | Deml et al. | 370/390 |
| 2003/0088685 A1* | 5/2003 | Lee | 709/230 |
| 2004/0213206 A1* | 10/2004 | McCormack et al. | 370/352 |
| 2006/0133359 A1* | 6/2006 | McCormack et al. | 370/352 |

FOREIGN PATENT DOCUMENTS

| EP | 1 128 703 A1 | 8/2001 |
|---|---|---|
| WO | 03/032583 A1 | 4/2003 |

OTHER PUBLICATIONS

European Patent Office, "European Search Report," filed in EPO Application No. 08153359.8 (EPO application related to 12/043,112), Aug. 18, 2010, 4 pages.

* cited by examiner

*Primary Examiner* — Andrew Lai

(74) *Attorney, Agent, or Firm* — Michael J. Fogarty, III

(57) ABSTRACT

System and method for correlating multiple frames of data associated with a single call into a call record. One embodiment comprises correlating data in a radio access network by capturing data passing to and from a radio network controller, identifying ATM Adaptation Layer type 5 (AAL5) frames within the data, assigning a first call identifier to the AAL5 frames, identifying ATM Adaptation Layer type 2 (AAL2) frames within the data, assigning a second call identifier to the AAL2 frames, and combining AAL2 frames and AAL5 frames having a same first call identifier and a same second call identifier into a call record. The data passing to and from the first radio network controller may be data passing over an Iub interface between a Node B and the radio network controller or data passing over an Iur interface between two radio network controllers.

23 Claims, 9 Drawing Sheets

UMTS PROTOCOL STACK-IUB

| RADIO NETWORK CONTROL PLANE | | TRANSPORT NETWORK CONTROL PLANE | PS DATA USER PLANE | BROADCAST DATA USER PLANE | CS DATA USER PLANE | CS VOICE USER PLANE |
|---|---|---|---|---|---|---|
| MM/SM/CC | | | APPLICATION | | APPLICATION | AMR CODEC |
| RRC | NBAP | ALCAP | PDCP | BMC | TAF | |
| | | | | | RLP | |
| RLC | | STC | RLC | | | |
| MAC | SSCF-UN1 | SSCF-UNI | MAC | | | |
| FP | SSCOP | SSCOP | FP | | | |
| AAL2 | AAL5 | AAL5 | AAL2 | | | |
| ATM | | | | | | |

*FIG. 2*

UMTS PROTOCOL STACK-IUR

| RADIO NETWORK CONTROL PLANE | | | TRANSPORT NETWORK CONTROL PLANE | PS DATA USER PLANE | CS DATA USER PLANE | | CS VOICE USER PLANE |
|---|---|---|---|---|---|---|---|
| MM/SM/CC | | | | APPLICATION | APPLICATION | | |
| RRC | RNSAP | | ALCAP | PDCP | TAF | | AMR CODEC |
| | SCCP | | STC | | RLP | | |
| RLC | MTP3-B | M3UA | MTP3-B | M3UA | RLC | | |
| MAC | SSCF-NN1 | SCTP | SSCF-NN1 | SCTP | MAC | | |
| FP | SSCOP | IP | SSCOP | IP | FP | | |
| AAL2 | AAL5 | AAL5 | AAL5 | AAL5 | AAL2 | | |
| ATM | | | | | | | |

SYSTEM AND METHOD FOR REAL-TIME CORRELATION OF AAL2 AND AAL5 MESSAGES FOR CALLS IN UTRAN

This application claims the benefit of U.S. Provisional Application No. 60/909,295, filed on Mar. 30, 2007, entitled System and Method for Real-Time Correlation of AAL2 and AAL5 Messages for Calls in UTRAN, which application is hereby incorporated herein by reference.

TECHNICAL FIELD

The present invention relates generally to a system and method for monitoring messages in a wireless system, and more particularly to a system and method for capturing and correlating related messages captured from the Iub and Iur interfaces of a UTRAN.

BACKGROUND

The Universal Mobile Telecommunications System (UMTS) is a third-generation (3G) mobile phone technology standardized first by the European Telecommunications Standards Institute (ETSI) and now by the 3rd Generation Partnership Project (3GPP). UMTS carries both circuit switched (CS) and packet switched (PS) traffic using Wideband Code Division Multiple Access (W-CDMA) as its air interface. The description of the network components and protocols used in UMTS are well known to those of ordinary skill in the art and are available to the public from 3GPP, ETSI, and other sources. The UMTS network architecture consists of three domains: Core Network (CN), UMTS Terrestrial Radio Access Network (UTRAN), and User Equipment (UE).

The Core Network provides switching and routing for user traffic and provides network management functions. The Core Network architecture is based on the GSM network with GPRS. The UTRAN provides the air interface access to subscribers' UE. Base stations in the UTRAN are referred as Node-Bs, and the control equipment for the Node-Bs is called a Radio Network Controller (RNC). The UMTS User Equipment communicates via the WCDMA air interface to the Node-Bs. The UE may be attached to either the PS domain or CS domain or both. The UE is capable of simultaneously using PS services and CS services.

The Asynchronous Transfer Mode (ATM) is used for data transmission in UMTS. The ATM layer multiplexes and demultiplexes and routes ATM cells, and ensures their sequence from end to end. The ATM Adaptation Layers (AAL) are responsible for the creation and reception of payloads through the lower layers of ATM on behalf of different applications. ATM Adaptation Layer type 2 (AAL2) handles circuit-switched connections and packet connection protocol AAL5 is designed for data delivery.

One disadvantage of the prior art is the difficulty in evaluating service levels for individual subscribers. Because multiple UEs are communicating with Node Bs and RNCs at the same time, thousands of data and control messages per second can be passed between a Node B and an RNC and between RNCs. These messages follow several different protocol formats depending upon the purpose of the message. As a result, the messages passing on interfaces in the UTRAN do not provide sufficient information to determine which messages are related to the same subscriber.

A second disadvantage of the prior art is the lack of a capability to compile messages for a specific UE call into a single call record in real-time or near real-time.

SUMMARY OF THE INVENTION

These and other problems are generally solved or circumvented, and technical advantages are generally achieved, by embodiments of the present invention which provides a system and method for capturing messages from the Iur and Iub interfaces in a UTRAN and correlating the messages into call records for each user.

In accordance with an embodiment of the present invention, a method for correlating data in a radio access network comprises capturing data passing to and from a first radio network controller, identifying ATM Adaptation Layer type 5 (AAL5) frames within the data, assigning a first call identifier to the AAL5 frames, identifying ATM Adaptation Layer type 2 (AAL2) frames within the data, assigning a second call identifier to the AAL2 frames, and combining AAL2 frames and AAL5 frames having a same first call identifier and a same second call identifier into a call record. The data passing to and from the first radio network controller may comprise data passing over an Iub interface between a Node B and the first radio network controller or data passing over an Iur interface between the first radio network controller and a second radio network controller. The call record comprises service data units (SDUs) associated with a single call. The method may further comprise deciphering the AAL2 frames, and reassembling service data units (SDUs) carried in the AAL2 frames. Capturing data passing to and from a first radio network controller may further comprise capturing data passing from the first radio network controller to a first base station that is in communication with user equipment, and capturing data passing from the first radio network controller to a second base station that is in communication with the user equipment, wherein the first radio base station and the second radio base station are in communication with the user equipment at the same time.

In accordance with another embodiment of the present invention, a system for correlating data in a radio access network comprises a first correlation engine coupled to interfaces between components of the radio access network, wherein the first correlation engine receives ATM Adaptation Layer type 2 (AAL2) frames and ATM Adaptation Layer type 5 (AAL5) frames from the interfaces, a second correlation engine coupled to the first correlation engine, wherein the second correlation engine receives AAL2 frames from the first correlation engine, and a third correlation engine coupled to both the first and second correlation engines, wherein the third correlation engine receives AAL5 frames mapped to a first call identifier from the first correlation engine and receives AAL2 frames mapped to a second call identifier from the second correlation engine. The second correlation engine may further comprise a decipher engine, wherein the decipher engine decodes and deciphers the AAL2 frames, and a reassembly engine, wherein the reassembly engine assembles data carried in the AAL2 frames into service data units (SDUs). The first correlation engine maps parameters of a Node B Application Part (NBAP) protocol, a Access Link Control Application Part (ALCAP) protocol, and/or a Radio Network Subsystem Application Part (RNSAP) protocol to the first call identifier. The second correlation engine maps parameters of a Radio Resource Control (RRC) protocol to the second call identifier. The first correlation engine may be coupled to Iub and Iur interfaces in a UTRAN.

In accordance with another embodiment of the present invention, one or more processors running software applications may be used to correlate data frames in a radio access network. The system comprises computer-readable medium having computer-executable instructions for combing data associated with calls in a radio access network, said computer-executable instructions comprising means for capturing data from the radio access network, means for identifying ATM Adaptation Layer type 5 (AAL5) frames within the data, means for assigning a first call identifier to the AAL5 frames, means for identifying ATM Adaptation Layer type 2 (AAL2) frames within the data, means for assigning a second call identifier to the AAL2 frames, and means for combining AAL2 frames and AAL5 frames having a same first call identifier and a same second call identifier into a call record. The computer-readable medium further has computer-executable instructions comprising means for capturing data passing to and from a radio network controller over one or more Iub interfaces and one or more Iur interfaces in the radio access network. The computer-executable instructions further comprise means for deciphering the AAL2 frames, and means for reassembling service data units (SDUs) carried in the AAL2 frames. The computer-executable instructions may further comprises means for capturing data passing from a first base station in the radio access network to user equipment, and means for capturing data passing from second base station in the radio access network to the user equipment.

The present invention allows a system to analyze network performance on a real-time or near real-time basis for specific calls and specific users. The present invention also captures messages for a single call from multiple interfaces and compiles the messages having different protocols and formats into a call record for a specific user.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a protocol stack for an Iub interface;

FIG. 3 is a protocol stack for an Iur interface;

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
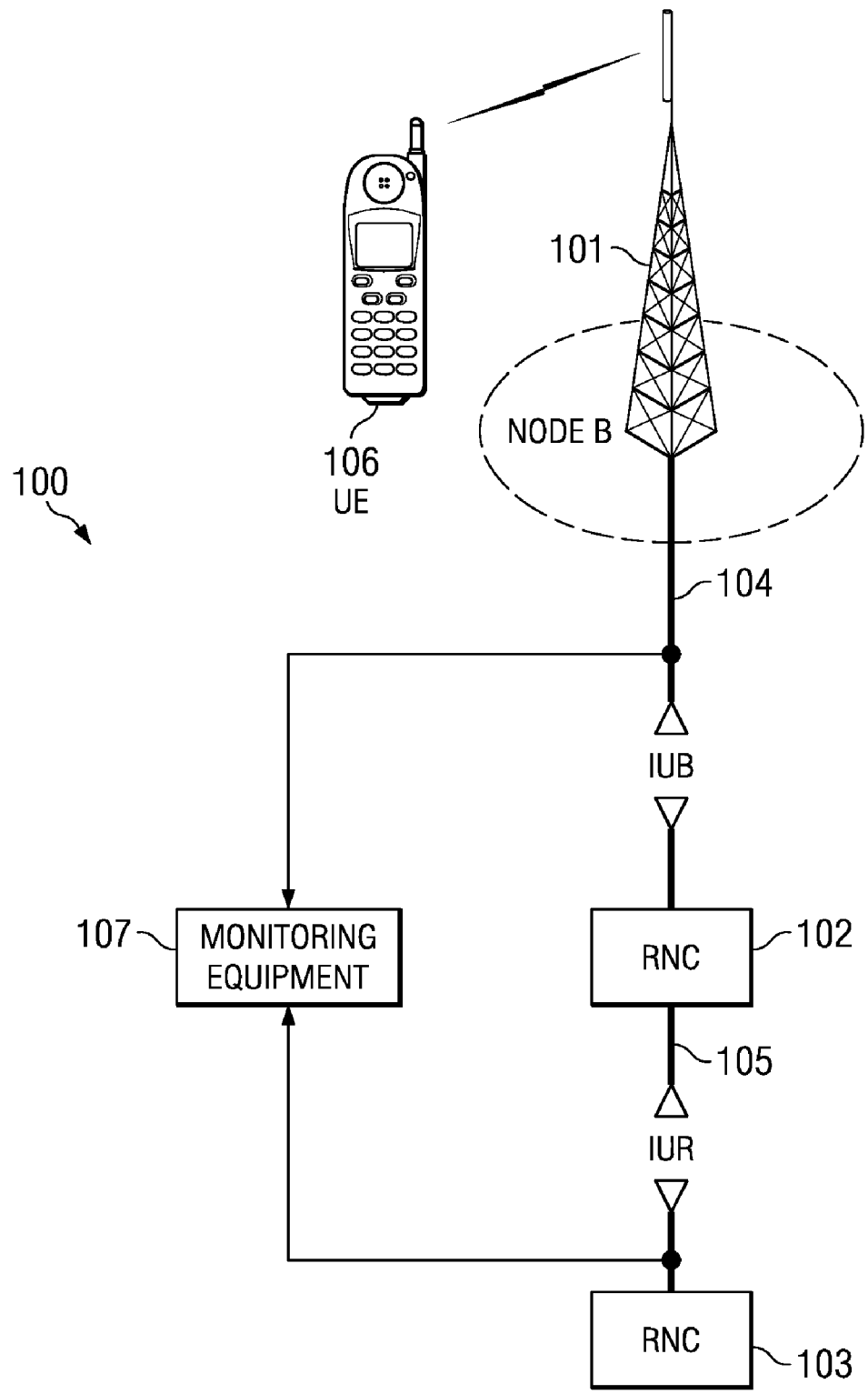
FIG. 1 illustrates monitoring equipment coupled to UMTS network interfaces according to embodiments of the invention.

FIG. 1 illustrates a portion of UTRAN 100 comprising Node B 101 and Radio Network Controllers (RNC) 102 and 103. Node B 101 communicates with RNC 102 via Iub interface 104. RNCs 102 and 103 communicate with each other via Iur interface 105. Node B 101 is in communication with User Equipment (UE) 106. Whenever UE 106 makes or receives a call, signaling messages are exchanged between Node B 101 and RNC 102 over Iub interface 104 and between RNCs 102 and 103 over Iur interface 105. The present invention tracks protocol messages carried on interfaces 104 and 105 using UTRAN monitoring equipment 107, which is non-intrusively coupled to the interfaces to capture substantially all of the protocol messages traveling across the interfaces. UTRAN monitoring equipment 107 identifies the messages belonging to a single call and correlates those messages into one call record for each call it detects.

FIG. 2 illustrates the protocol stack used on the Iub interface in a UTRAN network. FIG. 3 illustrates the protocol stack used on the Iur interface in a UTRAN network. UTRAN implements an ATM infrastructure for the Iub and Iur interfaces. UTRAN uses both AAL2 and AAL5 adaptations on top of the ATM layer. Node B Application Part (NBAP), Access Link Control Application Part (ALCAP) and Radio Network Subsystem Application Part (RNSAP) protocol messages are carried over AAL5 channels, and (Radio Resource Control) RRC protocol messages are carried over AAL2 channels.

In one embodiment of the invention, two correlation engines running in UTRAN monitoring equipment 107 correlate messages into call records. They are the UTRAN Call Id (CID) engine, an AAL5 correlator, and the UTRAN RRC manager, AAL2 correlator. The correlation engines may be, for example, software applications running on a processor in monitoring equipment 107.

UTRAN CID Engine—Call Correlation

The UTRAN CID Engine assigns a unique call identifier (Call Id) to every AAL5 message captured by UTRAN monitoring equipment 107. The Call Id is derived from the RNC identifier and the uplink scrambling code assigned to UE 106. The format of the AAL Call Id is as follows:

| AAL5 Call Id format | |
|---|---|
| RNC Id | Uplink Scrambling Code |
| 4 bytes | 4 bytes |

All AAL5 messages belonging to the same call are associated to the same uplink scrambling code and, therefore, will have the same AAL5 Call Id. Accordingly, all NBAP, ALCAP, and RNSAP protocol messages for a single call will have the same AAL5 Call Id. The UTRAN CID Engine correlates the various AAL5 protocols as follows.

NBAP Protocol Correlation

All call-based NBAP signaling begins with a NBAP Radio Link (RL) Setup Request message, which is sent from RNC 102 to Node B 101. This message includes the uplink scrambling code assigned to UE 106. An AAL5 Call Id is generated and assigned to the NBAP RL Setup Request message. The NBAP RL Setup Request message also includes a Controlling RNC (CRNC) Communication Context Id (CCID) that Node B 101 should use in its response to the NBAP RL Setup Request. The UTRAN CID Engine maintains a map that links the CCID to the AAL5 Call Id:

| CCID-Call Id Map | |
|---|---|
| CCID | AAL5 Call Id |
| 4 bytes | 8 bytes |

Node B 101 responds to the NBAP RL Setup Request with a NBAP RL Setup Response message, which includes the CCID and a Node B Communication Context Id (NBId). From that point on, the NBId is used by RNC 102 in all communication with Node B 101 for this call. Using the CCID, UTRAN CID Engine does a lookup in the CCID-Call Id Map to identify the AAL5 Call Id for the call. The AAL5 Call Id found in the CCID-Call Id Map is assigned to the NBAP RL Setup Response message. The UTRAN CID Engine also maintains a map that links the NBId to the AAL5 Call Id:

| NBId-Call Id Map | |
|---|---|
| NBId | AAL5 Call Id |
| 4 bytes | 8 bytes |

With the aid of the CCID and NBAP Call Id maps, all NBAP messages from NBAP RL Setup to NBAP RL deletion will be assigned to the same AAL5 Call Id. NBId and CCID are unique only per Node B, so a separate NBId-Call Id map is maintained for each Node B.

Macro-Diversity and Micro-Diversity Handling

Micro-diversity is the addition of a radio link in the same Node B. This procedure is initiated by a NBAP RL Addition Request, which includes the same NBId as in the NBAP RL Setup Response message. So the UTRAN CID Engine again uses the NBId to assign the AAL5 Call Id to the NBAP RL Addition Request messages. NBAP RL Addition Response messages have the same CCID as in the NBAP RL Setup Request message and, therefore, are correlated in a similar fashion.

Macro-diversity is the addition of a radio link in a different Node B. This procedure is initiated by a NBAP RL Setup Request message. From the UTRAN CID Engine point of view, there is no difference between the addition of the first radio link versus the addition of a $2^{nd}$ or $N^{th}$ radio link because the signaling flow is exactly the same. Since the CCID-Call Id map and NBId-Call Id map are maintained per Node B, any new radio link in a different Node B would involve adding new entries to the CCID-Call Id and NBId-Call Id maps maintained for that Node B. Since the uplink scrambling code is still the same, the UTRAN CID Engine will assign the same AAL5 Call Id in all macro-diversity and micro-diversity scenarios.

Change of Uplink Scrambling Code

UE 106 operates in various service states depending on the type of physical channel that the UTRAN network has allocated. Transitions between different states are based on inactivity timers and the amount of traffic that UE 106 or the UTRAN network wants to send. UE 106 operates in Cell-DCH (Dedicated Channel) state to exchange relatively large amounts of data. In Cell-DCH state, a dedicated channel with an individual code is assigned to UE 106. Data can be sent to and from UE 106 without prior reservation of resources. For transmission of relatively small amounts of data, UE 106 transitions to Cell-FACH state, in which UE 106 sends and receives data via the Random Access Channel (RACH) and Forward Access Channel (FACH). The RACH and FACH channels are shared between several devices.

The NBAP procedures are used by RNC 102 to setup radio links and put UE 106 into CELL-DCH state. Based on RRC measurement reports, the RNC may delete all radio links and set UE 106 in CELL-FACH state. After a period of time, RNC 102 may setup new radio links and UE 106 will be back in CELL-DCH state. This pattern of toggling back and forth between CELL-DCH and CELL-FACH state can happen very frequently when UE 106 is making a PS call. Every time UE 106 goes back to CELL-DCH state, it may be assigned a uplink scrambling code that is different than the last uplink scrambling code it used. Because the AAL5 Call Id is based on the uplink scrambling code, it is possible during a single PS call to have several NBAP legs with each leg carrying a unique uplink scrambling code and, therefore, a unique AAL5 Call Id for each NBAP leg.

The UTRAN CID Engine only guarantees unique a AAL5 Call Id for the AAL5 messages between the establishment of the first radio link and the termination of the last radio link. Since the RRC leg of a call will contain the uplink scrambling code changes, the UTRAN RRC manager—the AAL2 correlator—will provide information to combine all the legs of a PS call into a single call record.

ALCAP Protocol Correlation

ALCAP signaling begins with an Establishment Request (ERQ) message followed by an Establishment Response (ECF) message by the receiver. Certain NBAP messages that establish a DCH-Id, such as the NBAP RL Setup Response message, will have a Binding Id parameter for every DCH-Id being established. For every DCH-Id that is established, an ALCAP ERQ message is sent with a Served User Generated Reference (SUGR) parameter that exactly equals the Binding Id in the NBAP message for that DCH-Id. The ERQ message also has a Path Id/Channel Id combination that translates to a unique VPI/VCI/CID channel. This is the channel that will receive the AAL2 frames for that DCH-Id. This allows the present invention to established a correlation from the NBAP message that initiates the ALCAP to the various ALCAP messages and the AAL2 channels that have been setup. All of these may be tied to the same AAL5 Call Id using a map.

The ALCAP protocol has two parameters, Originating Signaling Association Id (OSAId) and Destination Signaling Association Id (DSAId), that are similar to the NBId and CCID parameters in the NBAP protocol. Accordingly, similar OSAId-AAL5 Call Id maps and DSAId-AAL5 Call Id maps are setup per Node B. A mapping is also setup between the identified VPI/VCI/CID and the associated AAL5 Call Id. Any AAL2 frame on that VPI/VCI/CID will be tagged with the associated AAL5 Call Id (or the uplink scrambling code) and the DCH-Id. The OSAId, DSAId, and VPI/VCI/CID maps are set up as follows:

| OSAId-Call Id Map | |
|---|---|
| OSAId | AAL5 Call Id |
| 4 bytes | 8 bytes |

| DSAId-Call Id Map | |
|---|---|
| DSAId | AAL5 Call Id |
| 4 bytes | 8 bytes |

| VPI/VCI/CID - Call Id - DCH-Id Map | | |
|---|---|---|
| VPI/VCI/CID | AAL5 Call Id | DCH-Id |
| 8 bytes | 8 bytes | 2 bytes |

With the help of these maps the ALCAP legs and the established DCH channels can be tied to a AAL5 Call Id.

RNSAP Protocol Correlation

RNSAP is transported via connection-oriented SCCP on IuR interface 105. The SCCP connection begins with SCCP Connection Request (CR) and SCCP Connection Confirmed (CC) messages followed by DT1 messages IuR: SCCP CR (Source Local Reference=x);
IuR: SCCP CC (Source Local Reference=y, Destination Local Reference=x);
IuR: SCCP DT1 (Destination Local Reference=y)-RNSAP Radio Link Setup Request.

The messages in the RNSAP protocol are often the same as the NBAP protocol messages, such as Radio Link Setup Request and Response. The RNSAP Radio Link (RL) Setup Request message contains an uplink-scrambling code like the NBAP RL Setup Request message from which the AAL5 Call Id is generated. A map is then created which maintains the mapping between the source local reference and the AAL5 Call Id as well as the destination local reference and the AAL5 Call Id. This mapping is maintained per RNC using the RNC point code (PC) that is present in the SCCP message.

| Source Reference-Call Id Map | |
|---|---|
| RNC PC + Source Reference | AAL5 Call Id |
| 8 bytes | 8 bytes |

| Dest Reference-Call Id Map | |
|---|---|
| RNC PC + Dest Reference | AAL5 Call Id |
| 8 bytes | 8 bytes |

The RNSAP RL Setup Response message contains DCH-Id and Binding Id as in the NBAP RL Setup Response message. This is used to correlate the ALCAP protocol messages and the dedicated AAL2 channels on IuR interface 105.

Data transmissions between Node B 101 and RNC 102 are defined by dedicated transport channel (DCH) frame protocol (FP) procedures on Iub interface 104. In particular, the FP procedures define uplink (from a Node B to an RNC) and downlink (from an RNC to a Node B) data frames. Each uplink or downlink data frame comprises a header portion and a payload portion, which is also referred to as a protocol data unit (PDU), and supports multiplexing a number of DCHs in the payload portion. Each DCH comprises Transport Blocks (TBs), which are the basic units used to convey data. The size and number of TBs in each DCH of a data frame is identified by an associated transport format indicator (TFI) in the header portion of the data frame. The DCH FP procedures also apply to communications between RNCs 102 and 103 across Iur interface 105.

Using the mappings illustrated above, the UTRAN CID Engine correlates all NBAP, ALCAP and RNSAP messages that cross Iub and Iur interfaces 104 and 105. The UTRAN CID Engine also associates every FP Data Frame on DCH to a AAL5 Call Id (or uplink scrambling code) and DCH-Id.

UTRAN RRC Manager—Call Correlation

Figure 4:
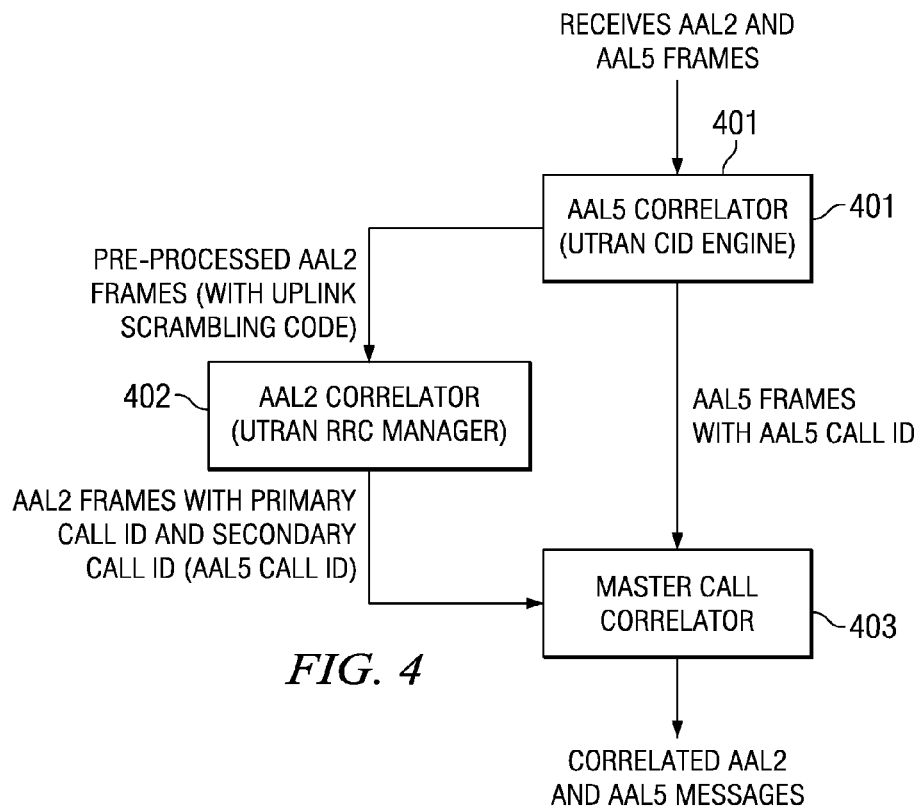
FIG. 4 illustrates the relationship among different correlation engines according to embodiments of the invention.

FIG. 4 illustrates the relationship between UTRAN CID Engine 401, the AAL5 correlator, and UTRAN RRC Manager 402, the AAL2 correlator. UTRAN RRC Manager 402 tracks the entire RRC leg of a call. It receives the raw AAL2 FP DATA frames from UTRAN CID Engine 401, which, as described above, will contain an AAL5 Call Id and DCH-Id if the frame was received on a DCH. UTRAN RRC Manager 402 performs the following functions:

Assign a unique Primary Call Id to every Transport Block that is present in an AAL2 frame;
Associate every Transport Block to its corresponding Radio Bearer Id (RB Id) with the help of DCH-Id;
Decipher the AAL2 frame with the assigned Primary Call Id and RB Id;
Reassemble the AAL2 frame with the assigned Primary Call Id and RB Id; and
Deliver the reassembled RRC Message with the Primary Call Id and the optional AAL5 Call Id.

An AAL5 Call Id will be present if the FP DATA frame was transmitted on a DCH. The AAL5 Call Id will be the Secondary Call Id in the context of the UTRAN RRC Manager.

UTRAN RRC Manager 402 then forwards the RRC messages with Call Id to Master Call Correlator 403. AAL5 messages are directly forwarded by UTRAN CID Engine 401 to Master Call Correlator 403. The Master Call Correlation engine 403 then links the AAL2 and AAL5 legs together using the supplied Call Id information. UTRAN CID Engine 401, UTRAN RRC Manager 402, and Master Call Correlator 403 are software applications that may run on separate processors or on the same processor in monitoring equipment 107. For example, monitoring equipment 107 may comprise multiple blades, wherein each blade has a processor that is capable of running one or more software applications, such as an AAL5 correlation application, an AAL2 correlation application, and/or a master call correlation application.

Primary Call Id Assignment

A Primary Call Id is assigned when UTRAN RRC Manager 402 receives an RRC Connection Request message in case of a mobile-originated call or receives a paging message in case of a mobile-terminated call. UE 106 is identified by means of the UE-Id that is present in both these messages. The Primary Call Id is generated for either of these messages using the RNC-Id and the time when that message was received. The format of the Primary Call Id is as follows:

| Primary Call Id Structure | | |
|---|---|---|
| RNC-Id | Current Time Stamp (Seconds) | Sequence Number (0-65535) |
| 4 bytes | 4 bytes | 2 bytes |

The two-byte Sequence Number is simply a running counter that is incremented by 1 every time a Call Id is assigned and wraps back to 0 when it reaches 65535. This means that as many as 65536 calls can be handled per second by UTRAN RRC Manager 402 by assigning each of them a unique Primary Call Id.

UTRAN RRC Manager 402 tracks a call by maintaining several keys in a map or hash table. For every call, the following identifiers must be tracked and associated with the call:

Uplink Scrambling Code—may change during a call, so specific RRC messages are analyzed to see if such a change is present;

Control Radio Network Temporary Identity (CRNTI)—can change during a call and the changes are tracked continuously; and UTRAN Radio Network Temporary Identity (URNTI).

UTRAN RRC Manager 402 takes the following actions to assign the Primary Call Id upon receiving various RRC messages.

Upon receipt of an RRC Connection Request message, UTRAN RRC Manager 402 creates a Primary Call Id and associates it with the UE-Id in the message by creating a UEId-Call Id Map as follows:

| UEId-Primary Call Id Map | | |
|---|---|---|
| UE-Id Type | UE-Id | Primary Call Id |
| 2 bytes | 8 bytes | 10 bytes |

Upon receipt of an RRC Connection Setup message, using the UE-Id in the message, UTRAN RRC Manager 402 gets the Primary Call Id from the UEId-Primary Call Id Map. UTRAN RRC Manager 402 also extracts other parameters from the message, such as a URNTI, CRNTI, and the uplink scrambling code and creates a URNTI-Call Id Map, CRNTI-Call Id Map, and Uplink Scrambling Code (ULS)-Call Id Map as follows:

| ULS-Primary Call Id Map | | |
|---|---|---|
| RNC-Id | Uplink Scrambling Code (ULS) | Primary Call Id |
| 4 bytes | 4 bytes | 10 bytes |

| CRNTI-Primary Call Id Map | | |
|---|---|---|
| Cell Id | CRNTI | Primary Call Id |
| 4 bytes | 4 bytes | 10 bytes |

| URNTI-Primary Call Id Map | |
|---|---|
| URNTI | Primary Call Id |
| 4 bytes | 10 bytes |

For AAL2 frames on a DCH channel, UTRAN RRC Manager 402 uses the Uplink Scrambling Code or AAL5 Call Id in the message to lookup the Primary Call Id in the ULS-Call Id Map.

For RRC messages that transition UE 106 from Cell-DCH state to Cell-FACH state, UTRAN RRC Manager 402 gets the Primary Call Id from the ULS-Primary Call Id Map and deletes that ULS entry from the map since UE 106 is now in CELL_FACH state. Using the CRNTI in the message, UTRAN RRC Manager 402 adds an entry to the CRNTI-Primary Call Id Map. Since CRNTI is unique only per cell, the Cell Id is included as a key with CRNTI. The Cell Id is derived from the primary scrambling code in the message.

For RRC messages that transition UE 106 from Cell-FACH state to Cell-DCH state, UTRAN RRC Manager 402 gets the Primary Call Id using the CRNTI or URNTI in the message and by doing a look up into the appropriate map. UTRAN RRC Manager 402 also invalidates the CRNTI entry and adds an entry to the ULS-Primary Call Id Map. The message will contain a new uplink scrambling code since it transitioned to Cell-DCH mode.

Upon receiving an RRC Connection Release Complete message, UTRAN RRC Manager 402 invalidates and deletes all entries related to the call. Accordingly, UTRAN RRC Manager 402 handles the following scenarios in call tracking and assigns the same unique Primary Call Id until UE 106 terminates the call:

Cell-DCH to Cell-FACH transition with Cell update;

Cell-DCH to Cell-FACH transition without Cell update;

Cell-DCH to Cell-FACH and back to Cell-DCH transition with the same uplink scrambling code;

Cell-DCH to Cell-FACH and back to Cell-DCH transition with a different uplink scrambling code; and Cell-FACH to Cell-DCH transition.

Figure 5A:
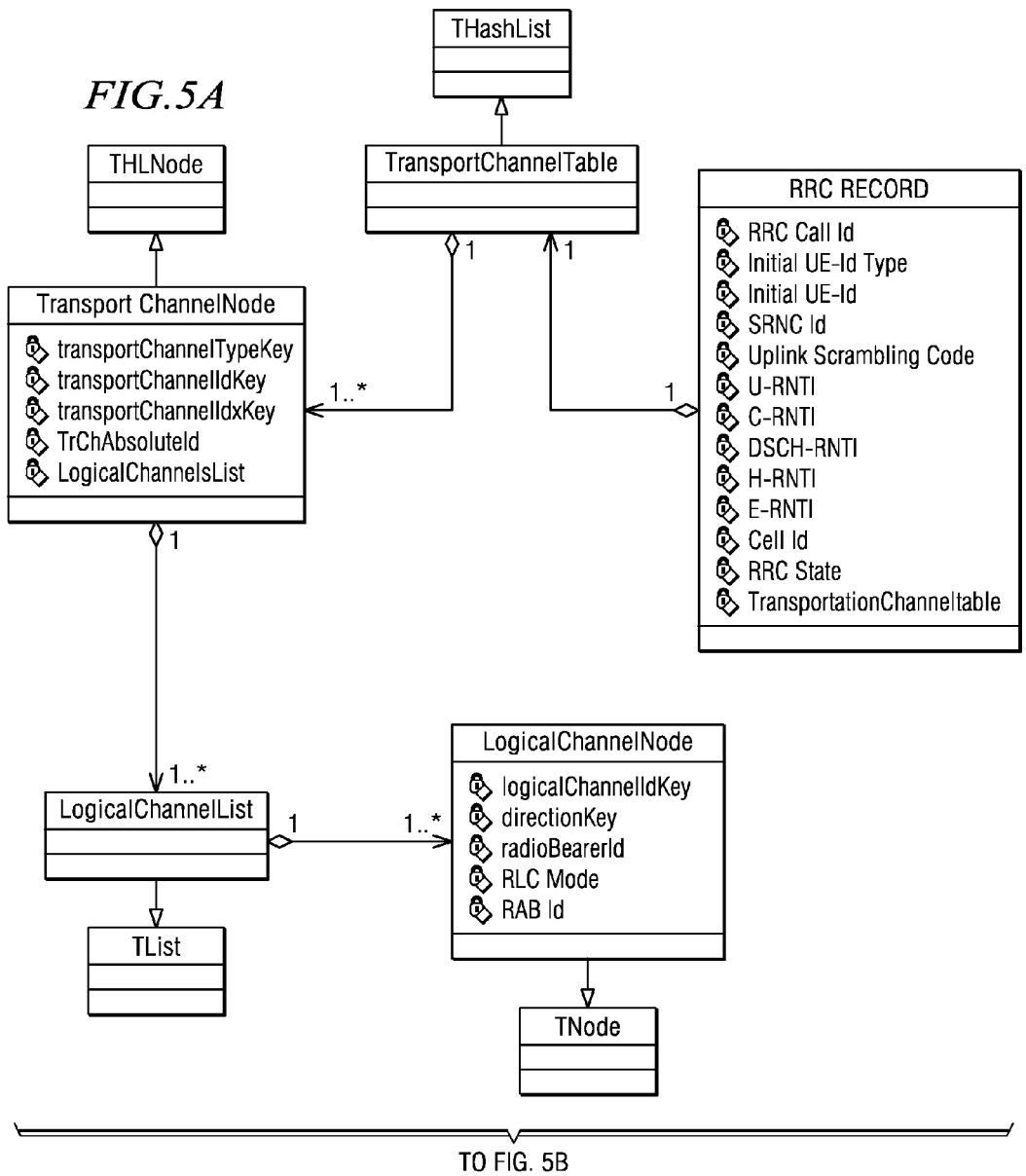
FIG. 5 illustrates a class diagram of an embodiment of a UTRAN RRC Manager according to embodiments of the invention.
Figure 5B:
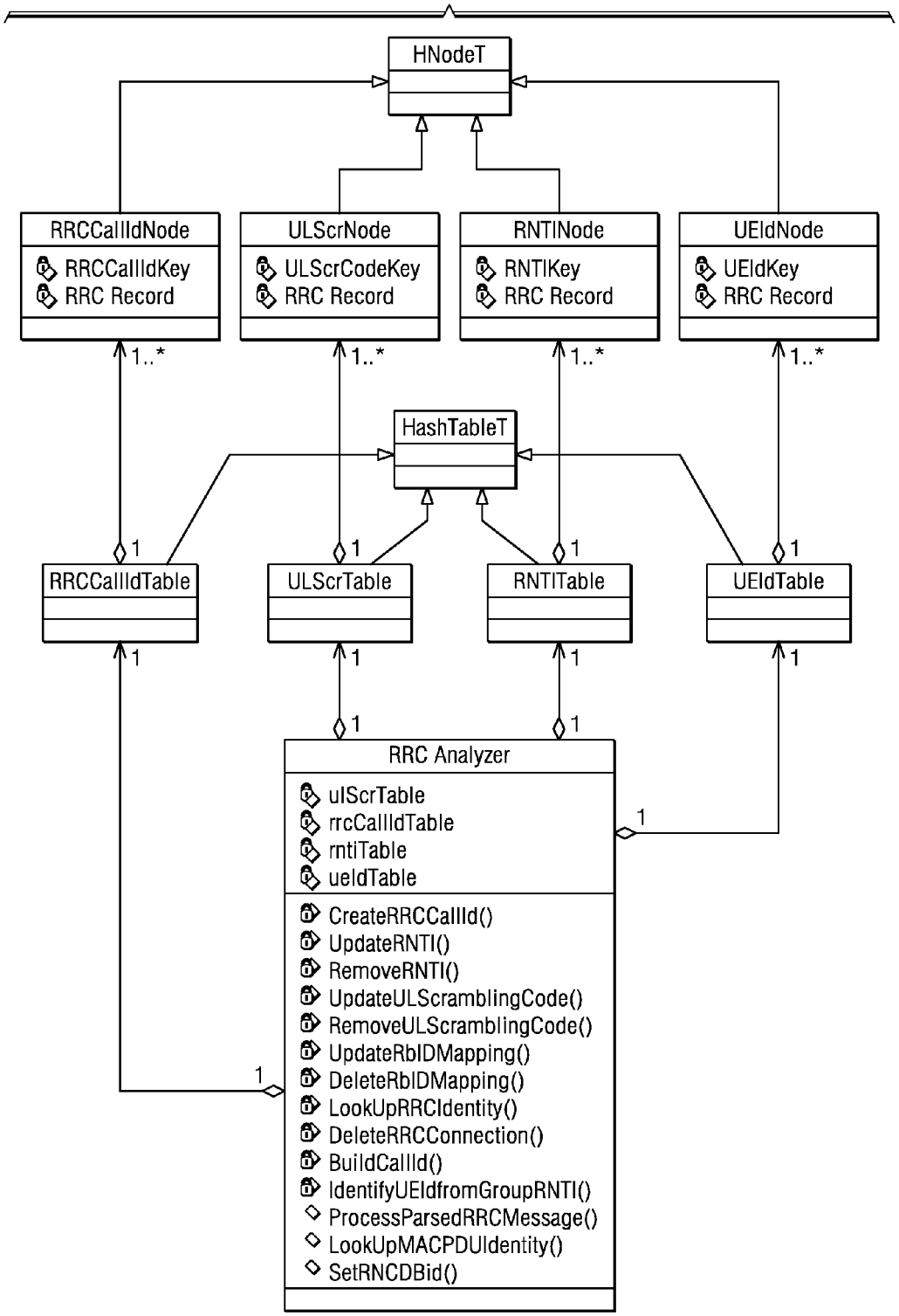

A class diagram for an embodiment of UTRAN RCC Manager 402 is illustrated in FIG. 5, which shows examples of the software modules and data structures that can be used to implement an AAL2 correlation engine.

Radio Bearer Id (RB Id) Assignment

An RB Id needs to be assigned to each transport block (TB) that is transmitted on a DCCH or DTCH channel to identify the logical channel to which the TB belongs. In addition, a Primary Call Id needs to be assigned to the TB. The primary reason for assigning an RB Id is because the RB-Id is used as a parameter to decipher the signal unit, if ciphering is enabled, and to reassemble the deciphered signal unit since RLC reassembly is done per UE per RB Id per direction. The RB Id mapping is obtained from the RRC Connection Setup, Radio Bearer Setup, and Radio Bearer Reconfiguration messages. Once this mapping is stored, the RB-Id for each TB can be determined using the DCH-Id that it carries if the TB is on a DCH channel. If the TB is on a RACH or FACH channel, the C/T field in the MAC header is used to get the RB Id.

Deciphering

To decipher AAL2 Transport Blocks on the IuB and IuR interfaces, the deciphering key (CK) needs to be associated with the Primary Call Id. The CK is obtained from the IuCs or IuPs interfaces depending on whether the call established in the CS Domain or PS Domain. The IuCs and IuPs interfaces connect the RNCs to the UMTS Core Network. The CK can also be tied to UE-Id, because the UE-Id parameter is present when a call is established on the IuPs or IuCs interface.

Once the UTRAN RRC Manager receives the CK along with the UE-Id, the CK can be tied to a Primary Call Id using the UEId-Primary Call Id Map. Accordingly, for any AAL2 Transport Block that carries a Primary Call Id, the UTRAN RRC Manager can obtain the corresponding CK to use for deciphering the TB.

RLC/MAC Reassembly Engine

Figure 6:
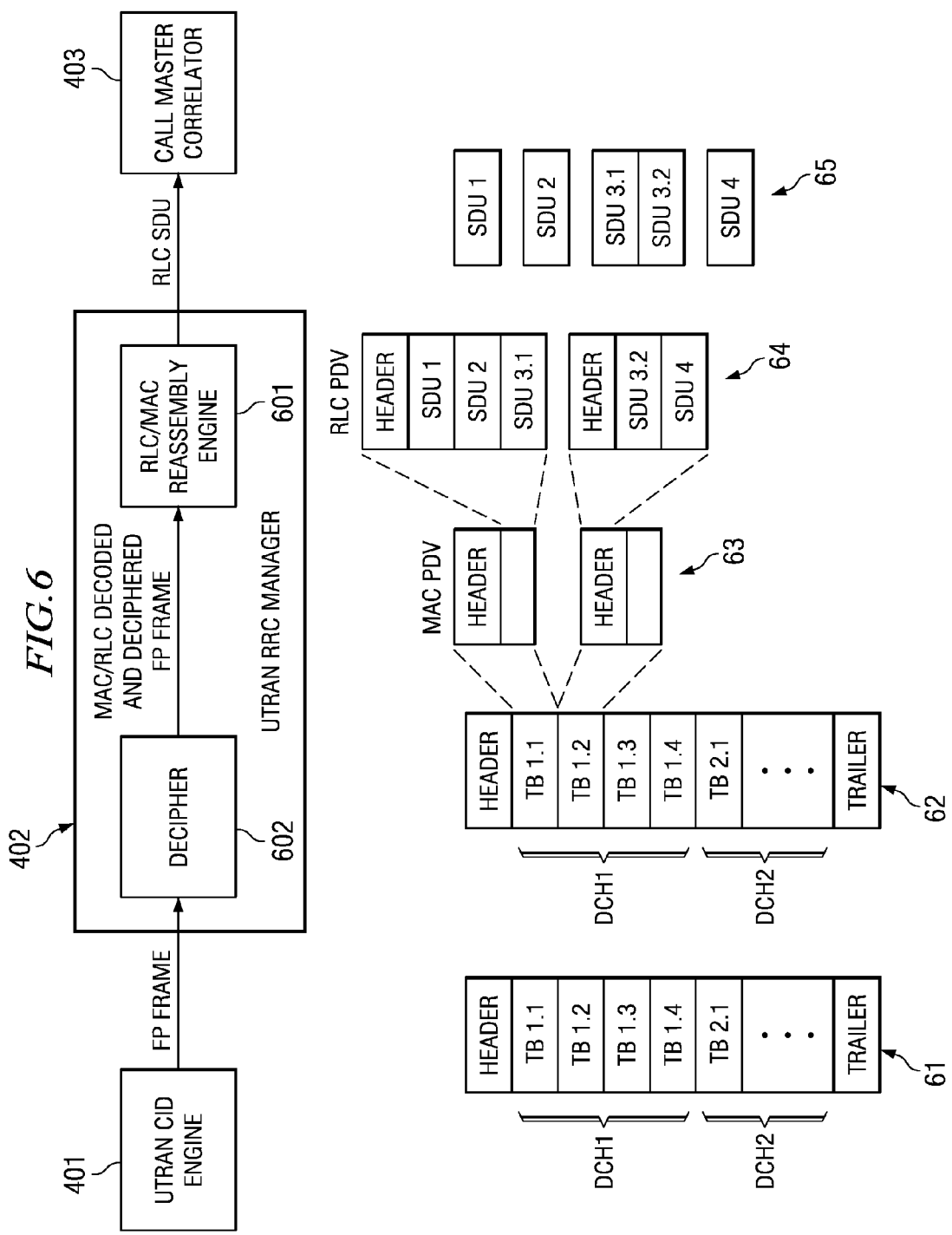
FIG. 6 illustrates the relationship between an RLC/MAC Reassembly Engine and correlation engines according to embodiments of the invention.

The Radio Link Control/Medium Access Control (RLC/MAC) protocol Reassembly Engine reassembles FP Transport Blocks received from the UTRAN CID Engine into RLC service data units (SDUs) in three RLC Modes: Transparent, Acknowledged, and Unacknowledged mode. FIG. 6 illustrates how RLC/MAC Reassembly Engine 601 and decipher application 602 fits into the packet processing flow of the UTRAN monitoring equipment. RLC/MAC Reassembly Engine 601 and decipher application 602 may be embodied as separate applications within UTRAN RRC Manager 402.

AAL2 frame 61 includes Transport Blocks that have been sent over different logical channels, DCH1 and DCH2, by the UE. The blocks from channels DCH1 and DCH2 are combined into FP frame 61 by UTRAN CID Engine 401 and sent to UTRAN RRX Manager 402. Decipher application 602 deciphers FP frame 61 into deciphered frame 62. The Transport Blocks of frame 62 comprise MAC PDUs 63, which in turn comprise RLC PDUs 64. RLC/MAC Reassembly Engine 601 processes and reassembles the data in RLC PDUs 64 into SDUs 65. When a complete SDU 65 is reassembled, RLC/MAC Reassembly Engine 601 and UTRAN RRC Manager 402 sends the SDU for further processing by Master Call Correlator. RLC/MAC Reassembly Engine 107 provides the following functions:

- Tracking the RLC reassembly process for individual logical channel instances, which are identified by RB Id, for different UEs, which are identified by the Primary Call Id, and tracking the RLC reassembly process for common logical channel instances;
- Reassembly in RLC Transparent Mode, segmented and non-segmented;
- Reassembly in RLC Unacknowledged and Acknowledged Mode, with the handling of segmentation, concatenation, and padding, and out-of-sequence arrival;
- Handling missing fragment detection via sequence number check, in Unacknowledged mode;
- Handling missing fragment detection, duplicate detection, out-of-window size arrival in Acknowledged mode;
- Handling RLC RESET and STATUS protocol control in Acknowledged mode;
- Handling macro-diversity or soft handover in which duplicate frames are received on multiple IuB/IuR connections; and
- Handling channel type switching, in which case the RLC Packet Data Units (PDUs) that make up an RLC SDU could come from different transport channels, such as RACH, FACH, and DCH.

RLC/MAC Reassembly Engine 601 is independent of the transport channel since every frame has a Primary Call Id and the RB Id assigned to it.

Figure 7:
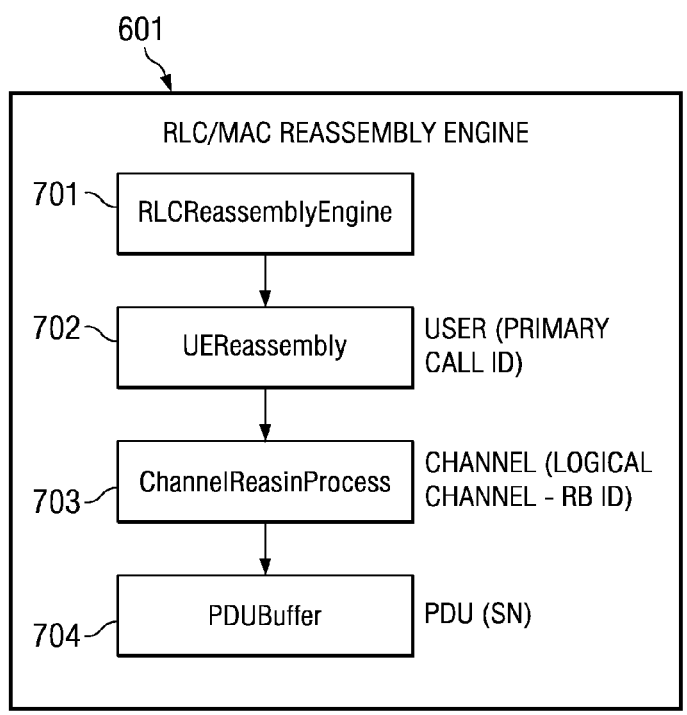
FIG. 7 illustrates the architecture of an RLC/MAC Reassembly Engine according to embodiments of the invention.

FIG. 7 illustrates the static data architecture of RLC/MAC Reassembly Engine 601. RLC/MAC Reassembly Engine 601 uses hierarchical data structures to keep track of RLC PDUs arriving on different channels for multiple users. RLC Reassembly Engine 701 is an instance of the RLC Reassembly Engine software. Each instance of RLC Reassembly Engine 701 has multiple instances of UE Reassembly 702 to keep track of individual active users. Each instance of UE Reassembly 702 is identified by a unique Primary Call Id. Each UE Reassembly instance 702 has multiple instances of ChannelReasmProcess 703 to keep track of the RLC reassembly processes for different logical channel instances for that user. Each instance of ChannelReasmProcess 703 is identified by a logical channel key, which consists of two elements: (1) Direction (i.e. uplink or downlink), and (2) RB Id, which may be a signaling Radio Bearer Id or logical channel instance Id. Each ChannelReasmProcess 703 has multiple instances of PDU Buffer 704 to keep track of the PDU fragments for a particular logical channel's RLC reassembly process. Each PDU Buffer 704 is identified by a Sequence Number (SN) of a PDU.

Figure 8:
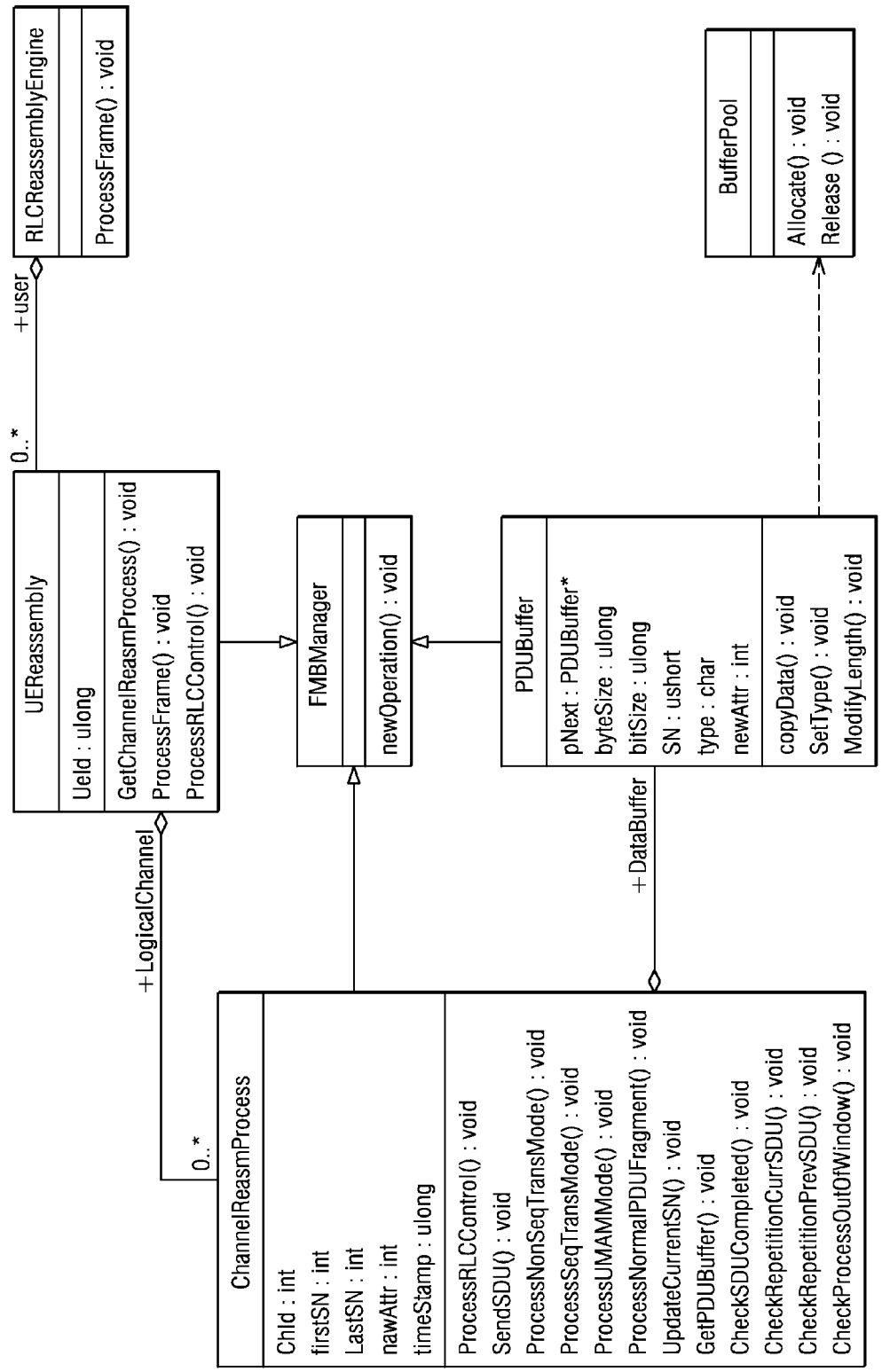
FIG. 8 is a class diagram of a RLC/MAC Reassembly Engine according to embodiments of the invention.

A class diagram of RLC/MAC Reassembly Engine 601 is illustrated in FIG. 8, which shows examples of the software modules and data structures that can be used to reassemble SDUs.

Macro-Diversity Handling of IuB/IuR Soft Handover

Figure 9:
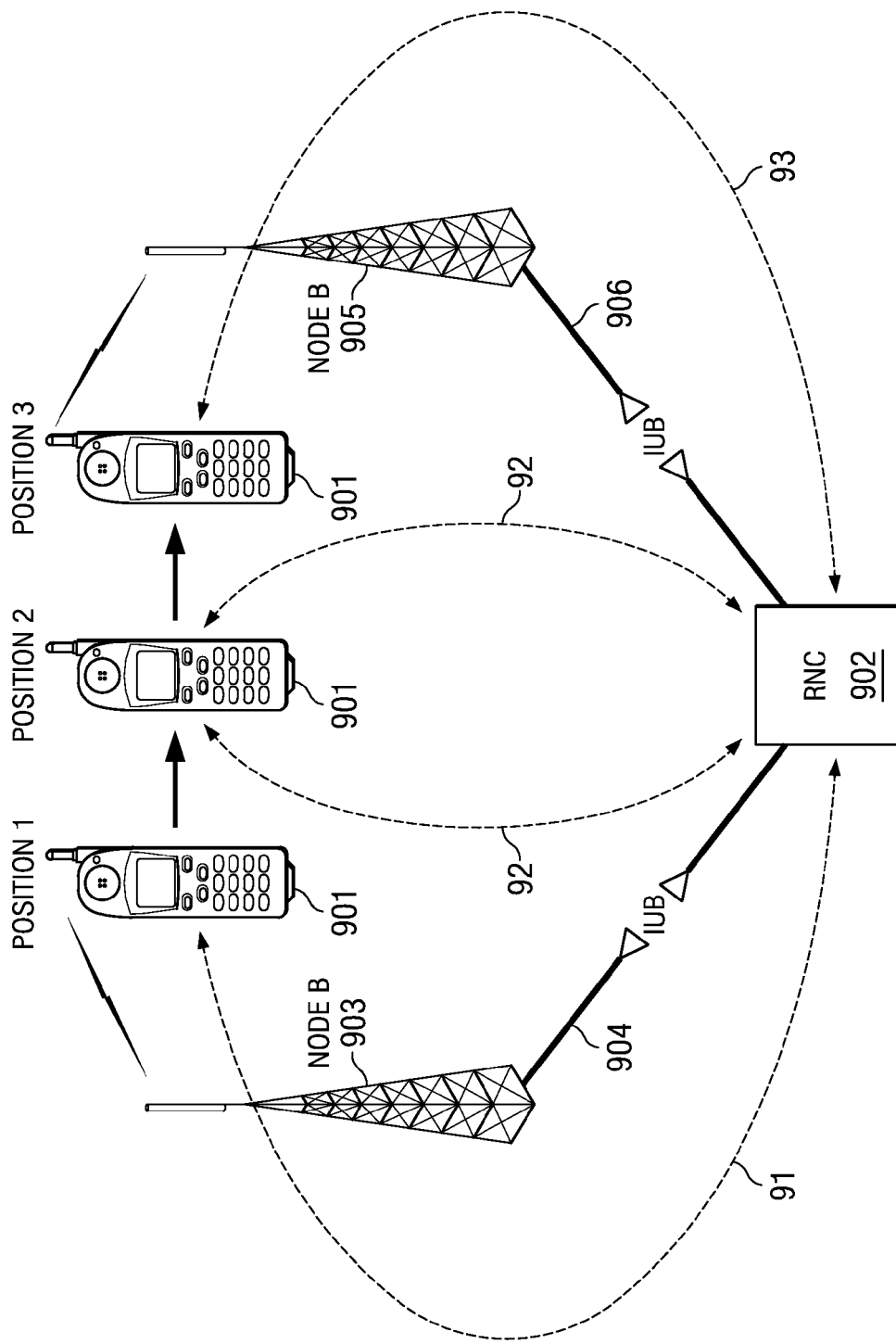
FIG. 9 is a block diagram illustrating tracking of messages according to one embodiment of the invention.

In the soft handover scenario illustrated in FIG. 9, the same frame is sent by UE 901 on multiple radio links. At position 1, frame 91 is communicated between UE 901 and RNC 902 only via Node B 903 and Iub interface 904. As UE 901 moves to position 2, it begins a soft handover operation from Node B 903 to Node B 905. At position 2, frame 92 is communicated between UE 901 and RNC both via Node B 903 and Iub interface 904 and via Node B 905 and Tub interface 906. As the soft handover is completed, UE 901's only radio link is with Node B 905 at position 3. Accordingly, at position 3, frame 93 is communicated between UE 901 and RNC 902 only via Node B 905 and Iub interface 906.

As a result of this handover, frames 92 for the same call on UE 901 may be captured by monitoring equipment from two routes at the same time. UTRAN RRC Manager 402 eliminates these duplicates by assigning the same Primary Call Id and RB Id to these duplicate frames 92. When multiple frames 92 reach RLC Reassembly Engine 601, they each go into the same PDU Buffer 704 because each of the duplicate frames have the same the RLC sequence number. RLC Reassembly Engine 601 takes the first error-free frame and discards the rest as duplicates. UTRAN RRC Manager 402 is able to handle IuB/IuR Soft Handover using its Primary Call Id and RB-Id tracking logic.

Monitoring equipment 107 captures all messages for all UEs and uses the Primary Call Id and the AAL5 Call Id (or Secondary Call Id) to identify messages belonging to each call for the UEs. Monitoring equipment 107 combines messages having the same Primary Call Id and AAL5 Call Id into call records per UE per call. The call records contain the SDUs for the call and allow an operator to evaluate the call for quality of service, call type, call length and other performance indicators.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the format of the various mappings and identifiers described herein may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for correlating data in a radio access network, comprising:

capturing data passing to and from a first radio network controller (RNC);

identifying ATM Adaptation Layer type 5 (AAL5) frames within the data;

assigning an AAL5 call identifier to each of the AAL5 frames, the AAL5 call identifier comprising an identifier for the first RNC combined with an uplink scrambling code associated with the AAL5 frame;

identifying ATM Adaptation Layer type 2 (AAL2) frames within the data;

assigning an AAL2 call identifier to each of the AAL2 frames;

mapping the AAL2 call identifiers to associated AAL5 call identifiers; and creating a call record for each AAL5 call identifier, each call record comprising data from frames associated with a particular AAL5 call identifier and data from frames associated with AAL2 call identifiers that are mapped to the particular AAL5 call identifier.

2. The method of claim 1, wherein the data passing to and from the first radio network controller comprises data passing over an Iub interface between a Node B and the first radio network controller.

3. The method of claim 1, wherein the data passing to and from the first radio network controller comprises data passing over an Iur interface between the first radio network controller and a second radio network controller.

4. The method of claim 1, wherein the call record comprises service data units (SDUs) associated with a single call.

5. The method of claim 1, further comprising:
deciphering the AAL2 frames; and
reassembling service data units (SDUs) carried in the AAL2 frames.

6. The method of claim 1, wherein capturing data passing to and from the first radio network controller further comprises:
capturing data passing from the first radio network controller to a first base station that is in communication with user equipment; and
capturing data passing from the first radio network controller to a second base station that is in communication with the user equipment.

7. The method of claim 6, wherein the first radio base station and the second radio base station are in communication with the user equipment at the same time.

8. A system for correlating data in a radio access network, comprising:
a first correlation processor coupled to interfaces between components of the radio access network, wherein the first correlation processor receives ATM Adaptation Layer type 2 (AAL2) frames and ATM Adaptation Layer type 5 (AAL5) frames from the interfaces;
a second correlation processor coupled to the first correlation processor, wherein the second correlation processor receives AAL2 frames from the first correlation processor; and
a third correlation processor coupled to both the first and second correlation processor, wherein the third correlation processor receives AAL5 frames mapped to a first call identifier from the first correlation processor and receives AAL2 frames mapped to a second call identifier from the second correlation processor.

9. The system of claim 8, wherein the second correlation processor further comprises:
a decipher engine, wherein the decipher engine decodes and deciphers the AAL2 frames; and
a reassembly engine, wherein the reassembly engine assembles data carried in the AAL2 frames into service data units (SDUs).

10. The system of claim 8, wherein the first correlation processor maps parameters of a Node B Application Part (NBAP) protocol to the first call identifier.

11. The system of claim 8, wherein the first correlation processor maps parameters of an Access Link Control Application Part (ALCAP) protocol to the first call identifier.

12. The system of claim 8, wherein the first correlation processor maps parameters of a Radio Network Subsystem Application Part (RNSAP) protocol to the first call identifier.

13. The system of claim 8, wherein the second correlation processor maps parameters of a Radio Resource Control (RRC) protocol to the second call identifier.

14. The system of claim 8, wherein the first correlation processor is coupled to Iub and Iur interfaces in a UMTS Terrestrial Radio Access Network (UTRAN).

15. A non-transitory computer-readable storage medium having computer-executable instructions for combing data associated with calls in a radio access network, said computer-executable instructions comprising:
capturing data passing to and from a first radio network controller (RNC) in the radio access network;
identifying ATM Adaptation Layer type 5 (AAL5) frames within the data;
assigning an AAL5 call identifier to each of the AAL5 frames, the AAL5 call identifier comprising an identifier for the first RNC combined with an uplink scrambling code associated with the AAL5 frame;
identifying ATM Adaptation Layer type 2 (AAL2) frames within the data;
assigning an AAL2 call identifier to each of the AAL2 frames;
mapping the AAL2 call identifiers to associated AAL5 call identifiers; and
creating a call record for each AAL5 call identifier, each call record comprising data from frames associated with a particular AAL5 call identifier and data from frames associated with AAL2 call identifiers that are mapped to the particular AAL5 call identifier.

16. A non-transitory computer-readable storage medium having computer-executable instructions as recited in claim 15, wherein the capturing data from the radio access network further comprises:
capturing data passing to and from a radio network controller over one or more Iub interfaces and one or more Iur interfaces in the radio access network.

17. A non-transitory computer-readable storage medium having computer-executable instructions as recited in claim 15, wherein the call record comprises service data units (SDUs) associated with a single call.

18. A non-transitory computer-readable storage medium having computer-executable instructions as recited in claim 15, further comprising:
deciphering the AAL2 frames; and
reassembling service data units (SDUs) carried in the AAL2 frames.

19. A non-transitory computer-readable storage medium having computer-executable instructions as recited in claim 15, further comprising:
capturing data passing from a first base station in the radio access network to user equipment; and
capturing data passing from second base station in the radio access network to the user equipment.

20. A non-transitory computer-readable storage medium having computer-executable instructions as recited in claim 15, wherein the assigning a first call identifier further maps parameters of a Node B Application Part (NBAP) protocol to the first call identifier.

21. A non-transitory computer-readable storage medium having computer-executable instructions as recited in claim 15, wherein the assigning a first call identifier further maps parameters of an Access Link Control Application Part (AL-CAP) protocol to the first call identifier.

22. A non-transitory computer-readable storage medium having computer-executable instructions as recited in claim 15, wherein the assigning a first call identifier further maps parameters of a Radio Network Subsystem Application Part (RNSAP) protocol to the first call identifier.

23. A non-transitory computer-readable storage medium having computer-executable instructions as recited in claim 15, wherein the assigning a second call identifier further maps parameters of a Radio Resource Control (RRC) protocol to the second call identifier.

* * * * *